United States Patent
Baker et al.

(10) Patent No.: US 7,362,902 B1
(45) Date of Patent: Apr. 22, 2008

(54) RESOLVING CHARACTER DATA BOUNDARIES

(75) Inventors: Billy S. Baker, Lily, KY (US); Gary S. Smith, Barbourville, KY (US)

(73) Assignee: Affiliated Computer Services, Inc., Dallas, TX (US)

( * ) Notice: Subject to any disclaimer, the term of this patent is extended or adjusted under 35 U.S.C. 154(b) by 707 days.

(21) Appl. No.: 10/856,311

(22) Filed: May 28, 2004

(51) Int. Cl.
*G06K 9/72* (2006.01)

(52) U.S. Cl. ............... 382/229; 382/182; 382/187

(58) Field of Classification Search .......... 382/182, 382/187, 321, 229; 434/159; 706/20; 725/19
See application file for complete search history.

(56) References Cited

U.S. PATENT DOCUMENTS 5,563,959 A * 10/1996 Gallo et al. ............. 382/187
6,038,343 A * 3/2000 Shimizu et al. ......... 382/187

* cited by examiner

*Primary Examiner*—Samir Ahmed
*Assistant Examiner*—G. F. Cunningham
(74) *Attorney, Agent, or Firm*—Fish & Richardson P.C.

(57) ABSTRACT

Character data for a plurality of characters on which character recognition is being performed is received for processing. The character data includes character assignments and character locations. A reference location is defined in relation to a location of one of the characters, and the character assignments are resolved into one or more groupings according to a distance of the characters from the reference location.

36 Claims, 5 Drawing Sheets

FIG. 2A

| | | | | | | | | U | NHIC-TRAD-MEDICAL | |
|---|---|---|---|---|---|---|---|---|---|---|
| SIGNATURE ON FILE | | | 11.20.2002 | | | | | | X | |
| | | | | | | | | SIGNATURE | | |
| 11 06 03 | | | | | | | | | | |
| | JOSEPH M. PERKS, DO | | E09843 | | | | | | | |
| 11 20 03<br>22a | 11 20 03<br>22b | 11<br>22c | 1<br>22d | T1015<br>22e | U7 | | 1 | | 5900 | 1 |
| 26 | 26 | 26 | 26 | 26 | | | | | | |
| 24a | 24b | 24c | 24d | 24e | | | | | | |
| 75-1528614 | | | | 6124102 | | | X | | 5900 | 3400 |
| JOSEPH M. PERKS, D.O. | | | | CITY MEDICAL CENTER<br>411 MAIN STREET<br>DALLAS, TX 75401 | | | | | COMMUNITY HEALTH SVCS.<br>114 COMMERCE<br>AUSTIN, TX 75401 | |

RESOLVING CHARACTER DATA BOUNDARIES

TECHNICAL FIELD

This disclosure relates to automated character recognition, and more particularly to resolving data boundaries in automated character recognition.

BACKGROUND

The arrangement of characters on a document often communicates important information about the information conveyed by the characters. For example, characters may be arranged in one or more fields about a document, where each field conveys certain information, such as names, dates, or account numbers. Irregularities in the document that affect the position of the characters, such as text that is misaligned with the document or character size or spacing that is inconsistent with the field boundaries, can cause characters intended for a particular field to reside at least partially outside of the field. When automated character recognition is performed on the document, the characters may not be properly grouped into their intended fields. As a result, the information conveyed by the document may be unusable without further formatting. To improve the efficiency of automated character recognition, it is desirable to improve the ability of the automated character recognition system to account for irregularities in a document that affect the position of the characters relative to the expected location of fields.

SUMMARY

The invention is drawn to a technique of processing character data, for example from automated character recognition, to account for irregularities that affect the position of the characters relative to the expected location of fields.

One illustrative implementation includes a technique of resolving character assignments into groupings. According to the described techniques, character data, including character assignments and character locations, are received for characters on which character recognition is being performed. A reference location is defined in relation to a location of one or more characters. The character assignments are resolved into one or more groupings according to a distance of the characters from the reference location.

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

The details of one or more implementations of the invention are set forth in the accompanying drawings and the description below. Other features of the invention will be apparent from the description and drawings, and from the claims.

DESCRIPTION OF DRAWINGS

FIG. 2A is an illustrative document for character recognition by an illustrative optical character recognition system according to an implementation of the invention;

FIG. 2B is the illustrative document of FIG. 2A shown with read zones according to an implementation of the invention;

Like reference symbols in the various drawings indicate like elements.

DETAILED DESCRIPTION

Figure 1:
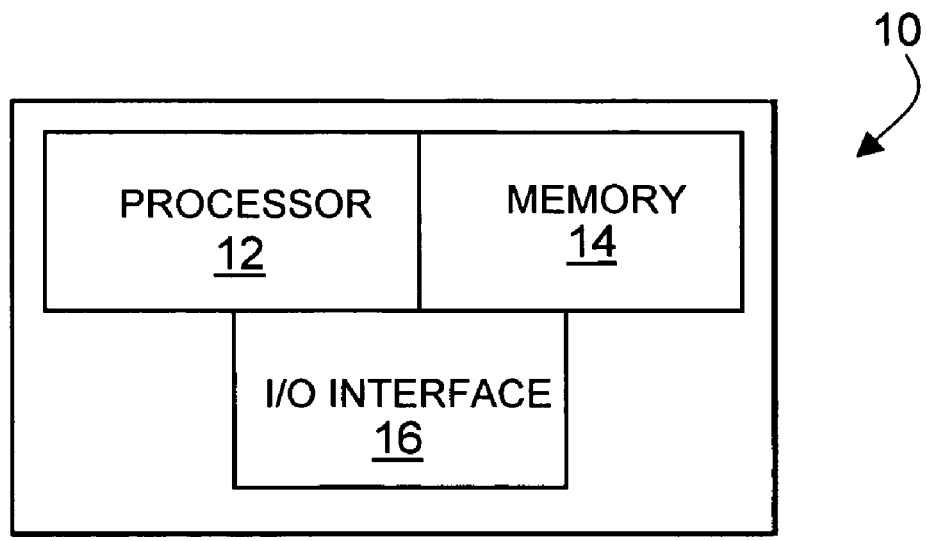
FIG. 1 is a schematic of an illustrative optical character recognition system according to an implementation of the invention.

Referring first to FIG. 1, an illustrative optical character recognition (OCR) system 10 according to an implementation of the invention includes a processor 12 coupled to a computer readable media (hereinafter "memory 14") and an input/output (I/O) interface 16. The processor 12 is operable to communicate with the memory 14 and the I/O interface 16, and to operate as a character recognition engine according to the methods described herein. The memory 14 is operable to store information for use by the processor 12 in performing the methods described herein. For example, the stored information can be instructions for use by the processor in operating as a character recognition engine according to the methods described herein. The I/O interface 16 can include one or more interface types operable to communicate information from outside of the system 10 to the processor 12 or memory 14 and vice versa. The I/O interface 16 can include provisions for digitizing an image, such as an image scanner (not specifically shown), or can be adapted to receive a digitized image from outside of the system 10. Other exemplary I/O interfaces that can be provided in the I/O interface 16 include electrical or optical data communication ports, radio frequency transponders, infrared transmitters and receivers, audio speakers and microphones, displays, keypads, and numerous other devices operable to communicate information to and from the system 10.

Although depicted schematically as a single processor 12 in the figures, it is anticipated that the processor 12 can include multiple processors residing in a single location within the system 10 or distributed about the system 10. Likewise, the memory 14, depicted schematically as a single memory 14, can be one or more memories residing in a single location within the system 10 or distributed about the system 10, for example, distributed between residing within and outside of the processor 12. Further, the memory 14 can be fixed in the system 10 or be wholly or partially removable from the system 10, for example, in the form of RAM, ROM, floppy disk, optical disk, hard drive and numerous other forms of storing information.

The OCR system 10 is adapted to receive and digitize a document or to receive an image, such as an image of a digitized document, on which character recognition will be performed. An illustrative image 20 of a digitized document is depicted in FIG. 2A; however, it is anticipated that the OCR system 10 can be used in performing character recognition on other types of images, such as characters that have been generated into a graphic file format (versus generated into a standard character code format such as ASCII), a digital photograph, a screen capture, or numerous other images that include characters.

The illustrative image 20 (FIG. 2) includes one or more groupings of characters, referred to herein as character strings 22. The character strings 22 can be arranged on the image 20 in one or more fields 24, where each field 24 contains character strings 22 conveying certain information. For example, one field 24 may contain character strings 22 that convey a date, while another field 24 may contain character strings 22 that convey a name or name and address. The illustrative image 20 has several fields, and the operations described herein can be applied to any of the fields of the image 20. However, the fields 24 used in discussing the operation of the illustrative implementation are numeric date field 24a, numeric date field 24b, place of service field 24c, type of service field 24d, and procedure code field 24e. The character string 22a in numeric date field 24a is a numeric date, the character string 22b in numeric date field 24b is a numeric date, the character string 22c in place of service field 24c is a code identifying the place a service was performed, character string 22d in the type of service field 24d is a code identifying the type of service, and the character string 22e in procedure code field 24e is a code identifying a service that was performed.

The intended boundaries of the fields 24 are demarcated on the illustrative image 20 by lines 26. Were the image 20 ideally arranged, each of the character strings 22 would reside within a respective field boundary demarcated by lines 26. However, the characters of the illustrative image 20 are shifted laterally relative to the fields 24, and as a result, the character strings 22 in some instances do not reside completely within the boundaries of a field 24. For example, character string 22a should reside entirely within the boundaries of field 24a, but resides partially in field 24b.

Of note, an image need not be arranged in the tabular arrangement of the illustrative image 20 to have fields. Other document formats have specified types of information arranged in fields (demarcated by lines or not). For example, a letter following a standardized letter format will include address information, a greeting, the body of the letter, and a closing arranged in predictable regions of the image (i.e. fields).

Figure 3:
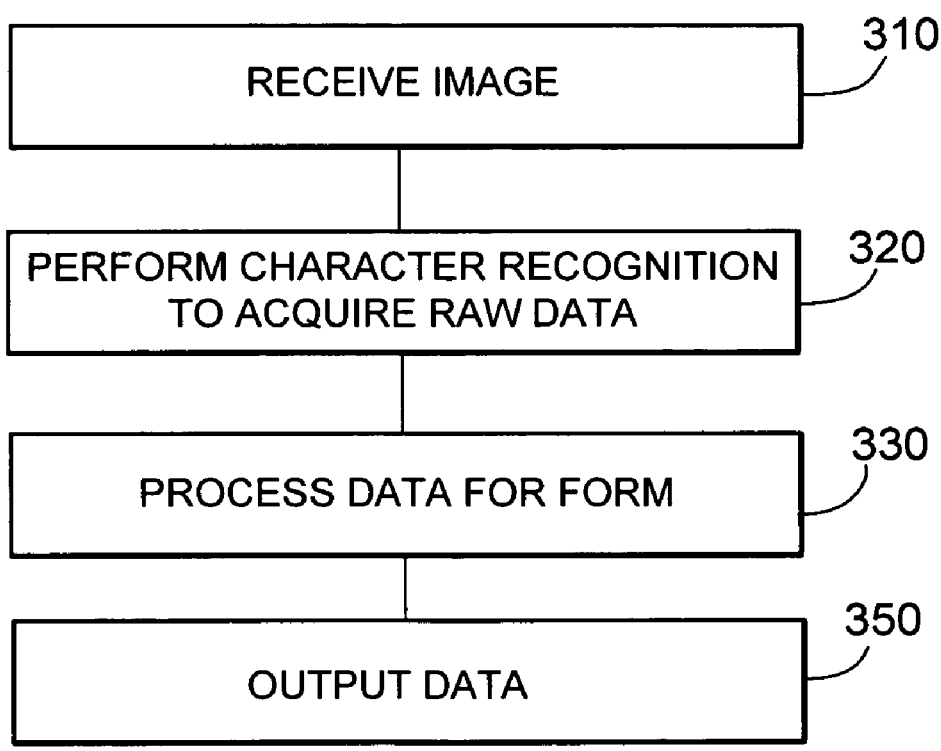
FIG. 3 is a flow diagram of the operation of an illustrative OCR system according to an implementation of the invention.

FIG. 3 depicts a flow diagram of the operation of the illustrative OCR system according to an implementation of the invention. At block 310, the OCR system receives an image on which character recognition will be performed. The OCR system may operate to produce the image itself, for example by scanning a document, or the OCR system may receive an image produced by a separate system, for example a dedicated scanning system.

At block 320, the OCR system performs character recognition on the image, such as illustrative image 20 (FIG. 2), and yields a coded representation of each character on which the recognition was performed (hereinafter a "character assignment"). The OCR system also correlates location information for the characters with the character assignment, for example, as coordinates of the characters on the image. The character assignments represent the raw data, or information, contained on the image. While the raw data may have some degree of formatting inherent from the manner in which it was arranged on the image, irregularities in the arrangement of characters on the image affect the accuracy of the formatting. For example, as in the illustrative image 20 (FIG. 2), the characters as a whole may be offset or shifted relative to the image so that the locations of the character strings 22 do not correspond to the expected boundaries of the fields 24. The character spacing, as well as spacing between character strings, can also affect whether the character strings reside within the expected boundaries of the fields 24. For example, if the character spacing or the spacing between character strings is greater than is accommodated by the field boundaries. If a character or characters intended for a particular field reside outside the field, the character may not be recognized as belonging to the field. As a result the raw data may be inaccurate or unusable until further formatting.

In performing character recognition on an image at block 320, the areas to which the OCR system looks for characters can be specified, for example, by defining one or more read zones in relation to the image. The boundaries of the read zones can be arranged to correspond to the boundaries of one or more fields on an image to direct the OCR system to look for characters within the fields. By defining multiple read zones, characters can be readily grouped according to the read zone, and thus location on the image, in which they reside. Defining the boundaries of a read zone to correspond to the boundaries of a field facilitates grouping the characters residing in the field.

Figure 2B:
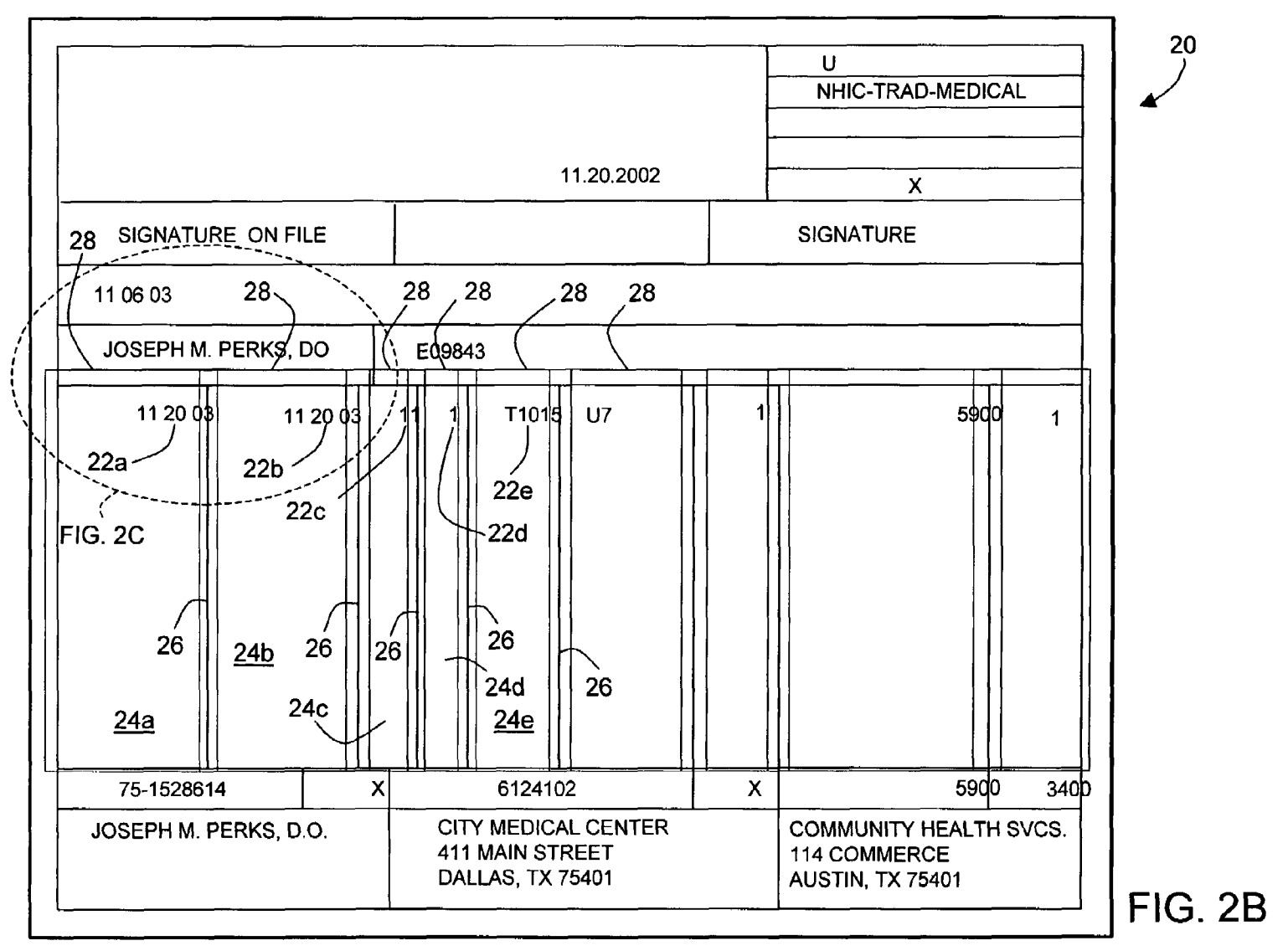

FIG. 2B depicts illustrative read zones 28 positioned to correspond with several fields of the image, including fields 24a-24e. While FIG. 2B only depicts read zones 28 positioned to correspond with a selected few of the fields 24 of the image 20, read zones corresponding with one or more other fields on the image may be used in performing character recognition on the image 20. Furthermore, although the read zones 28 are depicted as having a one-to-one correspondence to the fields 24 of the image, a one-to-one correspondence is not necessary.

Figure 2C:
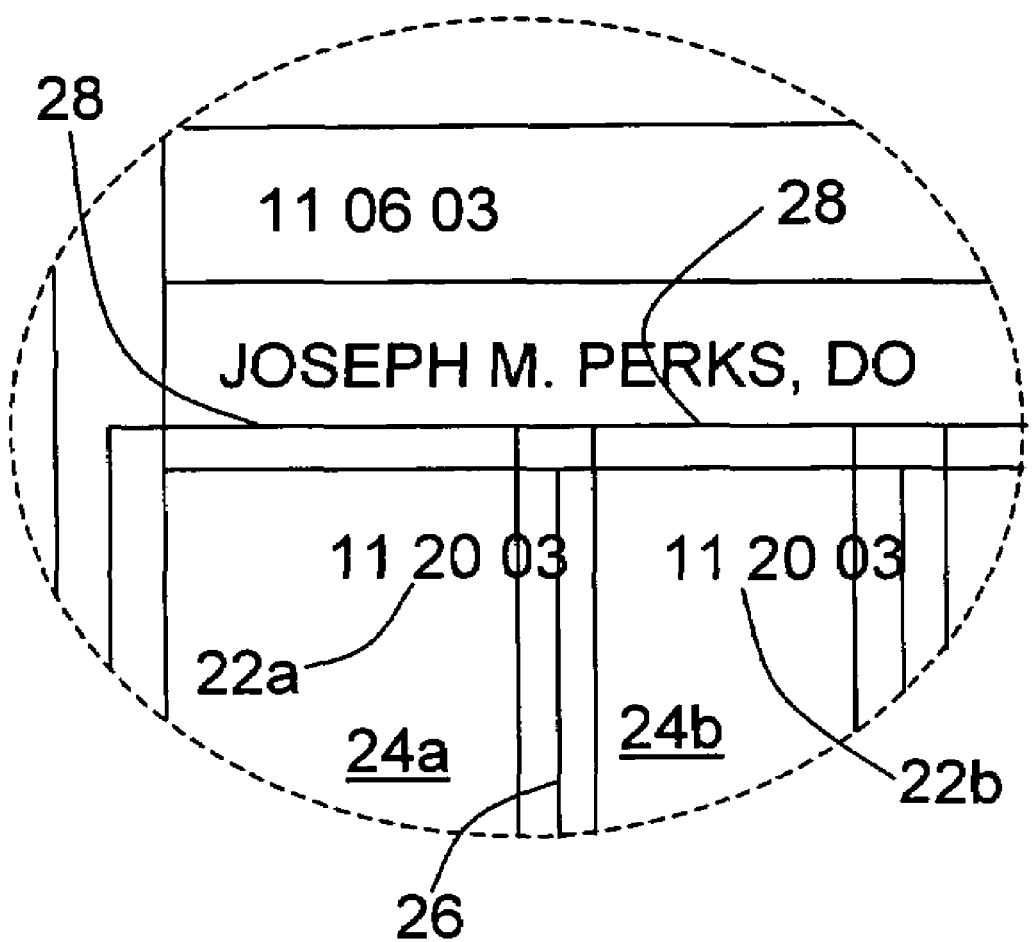
FIG. 2C is a detail view of the read zones of FIG. 2B.

As seen in the detail view of FIG. 2C, the read zones 28 may be sized to overlap the boundary lines 26 of the fields 24, and adjacent read zones 28 may also overlap one another. By providing the read zones 28 to overlap the boundary lines 26, characters falling on the boundary lines 26 (ex. the "3" character in character string 22a), although not residing within a field 24 will reside within a read zone 28. By providing for the read zones 28 to overlap, there is no boundary of adjacent read zones at which a character will be read partly in one read zone and partly in another. If adjacent read zones overlap, the OCR system may check for characters that have been read twice (once in each adjacent read zone) by looking for repeated instances of characters at the edges of the read zones. If such repeated characters are found, the subsequent processing steps, described below, can associate the characters with one or another field.

At block 330, the OCR system processes the raw data for form. The techniques by which the OCR system can process the raw data are numerous and can vary from application to application; however, in the illustrative OCR system, one such technique can be operated to resolve the characters into fields despite characters being misaligned with the document or having a character size or spacing that is inconsistent with the field boundaries. Such a technique is discussed in more detail with respect to FIG. 4.

At block 350, the OCR system outputs the formatted data, including character assignments and fields for the characters on which character recognition was performed.

Figure 4:
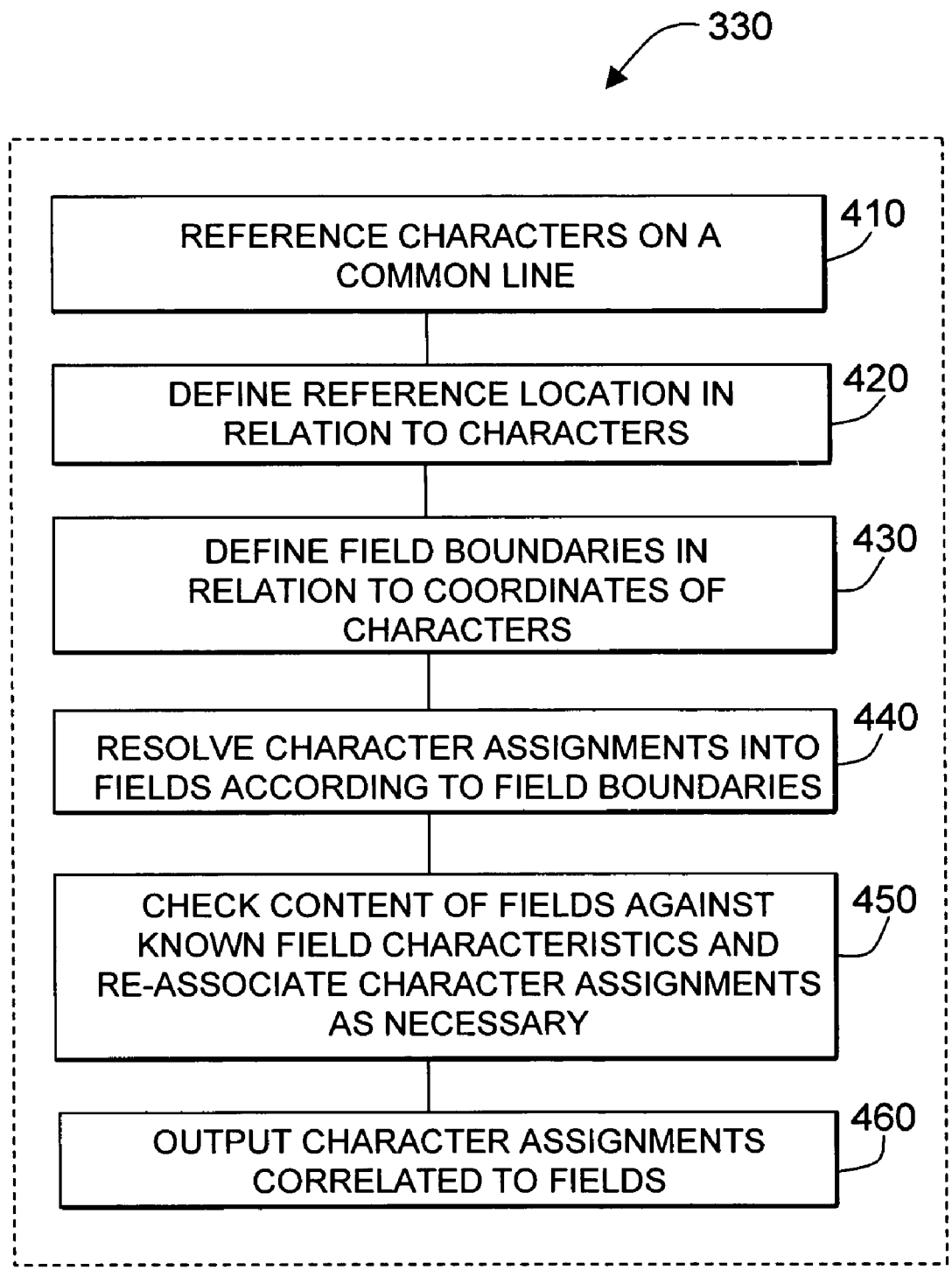
FIG. 4 is a flow diagram of the operation of an illustrative OCR system resolving character data boundaries.

FIG. 4 depicts a flow diagram of the operation of an illustrative technique for resolving character assignments to fields despite the characters being misaligned with the document or having a character size or spacing that is inconsistent with the field boundaries. The technique generally involves defining a reference location of the image in relation to the characters, and defining the boundaries of the fields in relation to the reference location. The technique also, or alternately, generally includes checking the character assignments resolved into fields against known characteristics of the field contents.

According to the technique, at block 410, characters along a common line of text (characters) are referenced. For example, by specifying a y-coordinate axis running perpendicular to lines of text on a document (i.e. from top to bottom on FIG. 2A), characters along a common line of text can be selected by selecting characters falling in a specified range of y-coordinates. The range of y-coordinates can be specified in relation to a height of the characters, and is selected to exclude characters residing in adjacent or offset lines of text. For example, on an image including regularly spaced lines of characters, the range of y-coordinates is selected to include characters in a line of text while excluding characters from adjacent horizontal lines or characters residing between the line of text and the horizontally adjacent line.

At block 420, a reference location is established in relation to the location of the characters. In one instance, the reference location may be established as a specified number of pixels to the left of the left most character in the line. However, the reference location can be established in relation to other characters, for example, the right most character, an intermediate character, or another character in the line.

At block 430, the boundaries of the fields are defined in relation to the reference location, and thus the characters. The field boundaries may be specified as an offset relative to the reference location, and may correspond to the dimensions between field boundaries on the image. For example, if a width dimension of a field on the image is 150 pixels and the reference location corresponds to the left edge of the field, the right edge of field may be specified as an offset of 150 pixels from the reference location. In an instance where the reference location is to the left of the left most character, the right boundary of each field into which characters are being placed can be specified as an offset from the reference location. For example, the right boundary of the first field may be specified as a first number of pixels in the x-axis from the boundary location. The right boundary of the second field, adjacent the first field, may be specified as a second number of pixels in the x-axis from the boundary location, and so on. By establishing the field boundaries in relation to the reference location, that is itself related to the position of the characters (versus the image), the field boundaries accommodate the characters being shifted relative to the image.

At block 440, the characters are resolved into their respective fields according to the boundaries defined at block 430. For example, characters residing between a left side reference location and the first right side boundary are separated into the first field. Characters residing between the first right boundary and the second right boundary are separated into the second field, and so on.

At block 450, the character assignments resolved into their respective fields may be optionally checked against specified characteristics of the field to verify that the content of the field is correct. The possible characteristics are numerous; however, some exemplary characteristics can include the number of characters in the field, the location of spaces or lack of spaces between characters in the field, and the type of characters (such as numeric or alpha characters) in the field. Another exemplary characteristic can include the content of the field, for example, verified using a validation table containing acceptable character strings of the field. If the content of one or more fields is found to be inconsistent with the specified characteristics of the field, and more so if the content of two adjacent fields are found to be inconsistent with the specified characteristics of the field, one or more character assignments of a field can be transferred to an adjacent field and the characteristics of one or both fields re-checked to verify the content. Repeated transferring character assignments between adjacent fields and re-checking the content of the fields may be necessary to establish fields that meet the specified characteristics. Once the fields meet the specified characteristics, operations can proceed to block 460.

Checking and adjusting the character assignments assigned to one or more fields against specified characteristics of the fields enables the field resolutions to account for variations in character size and spacing between character strings. For example, if a spacing between two adjacent character strings is inconsistent with the dimensions of the fields, even if the field boundaries are adjusted for overall character shift as in blocks 420 and 430, the locations of the characters may not correspond to the field locations. Checking and adjusting the character assignments according to specified field characteristics, as in block 450, operates to resolve the character assignments into fields in a manner that does not rely entirely on the location of the characters relative to the fields, but rather operates according to the content of the fields. Therefore, some degree of character to field misalignment is compensated for enabling character assignments to be resolved to fields despite an arrangement that does not precisely correspond to the dimensions of the fields.

Finally, at block 460, the character assignments correlated to fields are output. Thereafter, the operations at blocks 410-460 may be repeatedly operated for additional lines of text.

By way of example using the illustrative image of FIG. 2A, operating in accordance with block 410, an illustrative OCR system can reference a range of y-coordinates specified to encompass character strings 22a-22e. In accordance with block 420, the illustrative OCR system can establish a reference location, for example, as being a specified number of pixels to the left of the left most character (the "1" character in character string 22a). Operating in accordance with block 430, the right side boundaries of field 24a-24e can be defined according to specified offsets, for example expressed as a number of pixels, from the reference locations. Of note, as the characters on illustrative image 20 are offset to the right relative to the lines 26 demarcating field boundaries, the boundaries of the fields 24 for use in resolving character assignments to fields (as established according to block 430) will also be offset to the right relative to the lines 26. Using the boundaries defined according to block 430, the character assignments are resolved to fields in accordance with block 440. The character assignments can be output together with their correlation to fields according to block 460, or the content of the fields can be checked and adjusted according to block 450, then output according to block 460.

If for example it is desired to check the contents of field 24*b* against specified characteristics of the field, the specified characteristics might include that the arrangement of characters in field 24*b* is three pairs of characters each separated by a space (XX XX XX), because field 24*b* is a six digit numeric date field. Assuming for example sake that the character assignments resolved into field 24*b* in the previous operations of blocks 410 to 440 correspond to the characters "3 11 20 03". Checking the contents of field 24*b* against the format of the characters clearly shows that the character assignments resolved into field 24*b* are incorrect. By transferring the 3 to field 24*a*, the spacing of the characters is corrected to the "XX XX XX" format. The characteristics of field 24*a* can also be checked to verify that by transferring the character assignment for "3" into field 24*a*, the contents of field 24*a* are consistent with characteristics specified for field 24*a*. Once it is determined that the contents of field 24*b* are consistent with its specified characteristics, and that the characteristics of any other field that has been checked are accurate, the operations can proceed to block 460 and the character assignments and corresponding fields can be output.

It should be noted here that the operations at block 450 are optional and can be excluded from the technique. Likewise, the operations at block 450 can be performed apart from the operations at blocks 420 and 430, for example, to verify the content of character assignments resolved to fields in another manner.

A number of embodiments of the invention have been described. Nevertheless, it will be understood that various modifications may be made without departing from the spirit and scope of the invention. For example, while the techniques are described herein as compensating for x-axis offset, size incompatibility, and spacing of characters relative to the fields, the same concepts are equally applicable for compensating for y-axis and other vector offset, size incompatibility, and spacing of characters relative to fields. Accordingly, other embodiments are within the scope of the following claims.

What is claimed is:

1. A method of resolving character assignments into groupings of characters, comprising:
   receiving character data for a plurality of characters on which character recognition is being performed, the character data including character assignments representing characters determined by character recognition and locations of characters;
   defining a reference location in relation to a location of one of the characters; and
   resolving the character assignments into one or more groupings of characters according to a distance of the characters from the reference location.

2. The method of claim 1 further comprising:
   checking the contents of at least one grouping by comparing one or more character assignments resolved into the grouping against at least one specified characteristic of the grouping.

3. The method of claim 2 wherein the specified characteristic is at least one of a number of characters, a location of spaces or lack of spaces between characters, a type of characters, or a specified set of characters.

4. The method of claim 2 further comprising transferring one or more character assignments from the grouping to an adjacent grouping if the character assignments resolved into the grouping are inconsistent with the at least one specified characteristic of the grouping.

5. The method of claim 4 further comprising re-checking the contents of at least one of the groupings or the adjacent groupings.

6. The method of claim 1 wherein the reference location is defined in relation to a location of an end most character.

7. The method of claim 1 wherein the plurality of characters on which character recognition is being performed are arranged in a plurality of lines; and
   wherein receiving character data for a plurality of characters comprises receiving character data for a plurality of characters residing in a common line of characters.

8. The method of claim 7 further comprising defining a coordinate axis substantially perpendicular to the plurality of lines of characters; and
   wherein receiving character data for a plurality of characters residing in a common line of characters comprises receiving character data for a plurality of characters residing in a specified range of coordinates on the coordinate axis.

9. The method of claim 1 wherein resolving the character assignments into one or more groupings according to their distance from the reference location comprises:
   defining a plurality of grouping boundaries in relation to the reference location; and
   resolving character assignments into groupings according to the grouping boundaries.

10. The method of claim 9 wherein characters on which character recognition is being performed reside on an image having one or more fields defined thereon; and
    wherein at least one dimension between adjacent grouping boundaries corresponds to a dimension of a field.

11. The method of claim 1 further comprising:
    recognizing characters on an image in a plurality of read zones, at least two of the read zones overlapping; and
    checking for characters assignments duplicated in the at least two read zones.

12. The method of claim 11 further comprising resolving duplicated character assignments into a grouping according to at least one of a specified characteristic of one or more groupings or a distance from the reference location.

13. An article comprising a machine-readable medium storing instructions adapted to cause one or more machines to perform operations comprising:
    receiving character data for a plurality of characters on which character recognition is being performed, the character data including character assignments representing characters determined by character recognition and locations of characters;
    defining a reference location in relation to a location of one of the characters; and
    resolving the character assignments into one or more groupings of characters according to a distance of the characters from the reference location.

14. The article of claim 13 wherein the instructions are further adapted to cause one or machines to perform operations comprising:
    checking the contents of at least one grouping by comparing one or more character assignments resolved into the grouping against at least one specified characteristic of the grouping.

15. The article of claim 14 wherein the specified characteristic is at least one of number of characters, a location of spaces or lack of spaces between characters, a type of characters, or a specified set of characters.

16. The article of claim 14 wherein the instructions are further adapted to cause one or machines to perform operations comprising:

transferring one or more character assignments from the grouping to an adjacent grouping if the character assignments resolved into the grouping are inconsistent with the at least one specified characteristic of the grouping.

17. The article of claim 16 wherein the instructions are further adapted to cause one or machines to perform operations comprising re-checking the contents of at least one of the groupings or the adjacent groupings.

18. The article of claim 13 wherein the reference location is defined in relation to a location of an end most character.

19. The article of claim 13 wherein the plurality of characters on which character recognition is being performed are arranged in a plurality of lines; and
wherein receiving character data for a plurality of characters comprises receiving character data for a plurality of characters residing in a common line of characters.

20. The article of claim 19 wherein the instructions are further adapted to cause one or machines to perform operations comprising defining a coordinate axis substantially perpendicular to the plurality of lines of characters; and
wherein receiving character data for a plurality of characters residing in a common line of characters comprises receiving character data for a plurality of characters residing in a specified range of coordinates on the coordinate axis.

21. The article of claim 13 wherein resolving the character assignments into one or more groupings according to their distance from the reference location comprises:
defining a plurality of grouping boundaries in relation to the reference location; and
resolving character assignments into groupings according to the grouping boundaries.

22. The article of claim 21 wherein characters on which character recognition is being performed reside on an image having one or more fields defined thereon; and
wherein at least one dimension between adjacent grouping boundaries corresponds to a dimension of a field.

23. The article of claim 13 wherein the instructions are further adapted to cause one or machines to perform operations comprising:
recognizing characters on an image in a plurality of read zones, at least two of the read zones overlapping; and
checking for characters assignments duplicated in the at least two read zones.

24. The article of claim 23 wherein the instructions are further adapted to cause one or machines to perform operations comprising resolving duplicated character assignments into a grouping according to at least one of a specified characteristic of one or more groupings or a distance from the reference location.

25. A system for resolving character assignments into groupings of characters including a processor configured to perform operations comprising:
receiving character data for a plurality of characters on which character recognition is being performed, the character data including character assignments representing characters determined by character recognition and locations of characters;
defining a reference location in relation to a location of one of the characters; and
resolving the character assignments into one or more groupings of characters according to a distance of the characters from the reference location.

26. The system of claim 25 wherein the processor is further configured to perform operations comprising:
checking the contents of at least one grouping by comparing one or more character assignments resolved into the grouping against at least one specified characteristic of the grouping.

27. The system of claim 26 wherein the specified characteristic is at least one of number of characters, a location of spaces or lack of spaces between characters, a type of characters, or a specified set of characters.

28. The system of claim 26 wherein the processor is further configured to perform operations comprising transferring one or more character assignments from the grouping to an adjacent grouping if the character assignments resolved into the grouping are inconsistent with the at least one specified characteristic of the grouping.

29. The system of claim 28 wherein the processor is further configured to perform operations comprising re-checking the contents of at least one of the groupings or the adjacent groupings.

30. The system of claim 25 wherein the reference location is defined in relation to a location of an end most character.

31. The system of claim 25 wherein the plurality of characters on which character recognition is being performed are arranged in a plurality of lines; and
wherein receiving character data for a plurality of characters comprises receiving character data for a plurality of characters residing in a common line of characters.

32. The system of claim 31 wherein the processor is further configured to perform operations comprising defining a coordinate axis substantially perpendicular to the plurality of lines of characters; and
wherein receiving character data for a plurality of characters residing in a common line of characters comprises receiving character data for a plurality of characters residing in a specified range of coordinates on the coordinate axis.

33. The system of claim 25 wherein resolving the character assignments into one or more groupings according to their distance from the reference location comprises:
defining a plurality of grouping boundaries in relation to the reference location; and
resolving character assignments into groupings according to the grouping boundaries.

34. The system of claim 33 wherein characters on which character recognition is being performed reside on an image having one or more fields defined thereon; and
wherein at least one dimension between adjacent grouping boundaries corresponds to a dimension of a field.

35. The system of claim 25 wherein the processor is further configured to perform operations comprising:
recognizing characters on an image in a plurality of read zones, at least two of the read zones overlapping; and
checking for characters assignments duplicated in the at least two read zones.

36. The system of claim 35 wherein the processor is further configured to perform operations comprising resolving duplicated character assignments into a grouping according to at least one of a specified characteristic of one or more groupings or a distance from the reference location.

* * * * *

UNITED STATES PATENT AND TRADEMARK OFFICE
CERTIFICATE OF CORRECTION

| | |
|---|---|
| PATENT NO. | : 7,362,902 B1 |
| APPLICATION NO. | : 10/856311 |
| DATED | : April 22, 2008 |
| INVENTOR(S) | : Billy S. Baker and Gary S. Smith |

Page 1 of 1

It is certified that error appears in the above-identified patent and that said Letters Patent is hereby corrected as shown below:

In column 8, claim 14, line 55 – replace "adapted to cause one or machines to perform" with -- adapted to cause one or more machines to perform --

In column 8, claim 16, line 66 – replace "adapted to cause one or machines to perform" with -- adapted to cause one or more machines to perform --

In column 9, claim 17, line 7 – replace "adapted to cause one or machines to perform" with -- adapted to cause one or more machines to perform --

In column 9, claim 20, line 19 – replace "adapted to cause one or machines to perform" with -- adapted to cause one or more machines to perform --

In column 9, claim 23, line 40 – replace "adapted to cause one or machines to perform" with -- adapted to cause one or more machines to perform --

In column 9, claim 24, line 47 – replace "adapted to cause one or machines to perform" with -- adapted to cause one or more machines to perform --

Signed and Sealed this

Twenty-ninth Day of July, 2008

JON W. DUDAS
*Director of the United States Patent and Trademark Office*